W. O. POWELL.
PIPE BENDING MACHINE.
APPLICATION FILED OCT. 26, 1912.
1,136,364.
Patented Apr. 20, 1915.
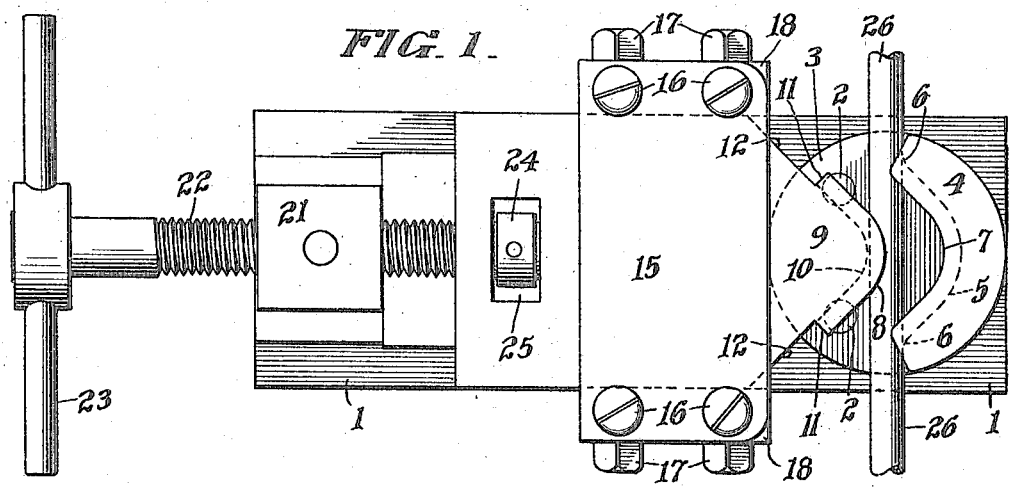
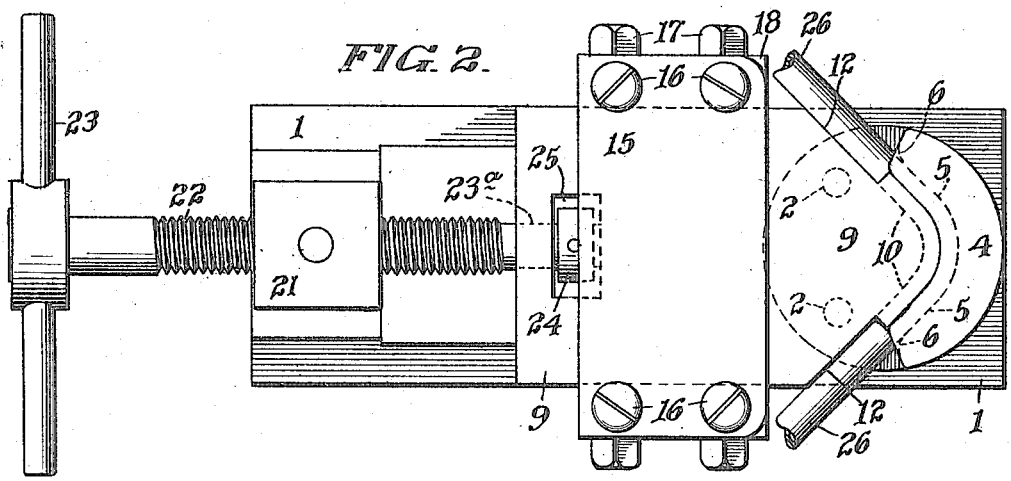
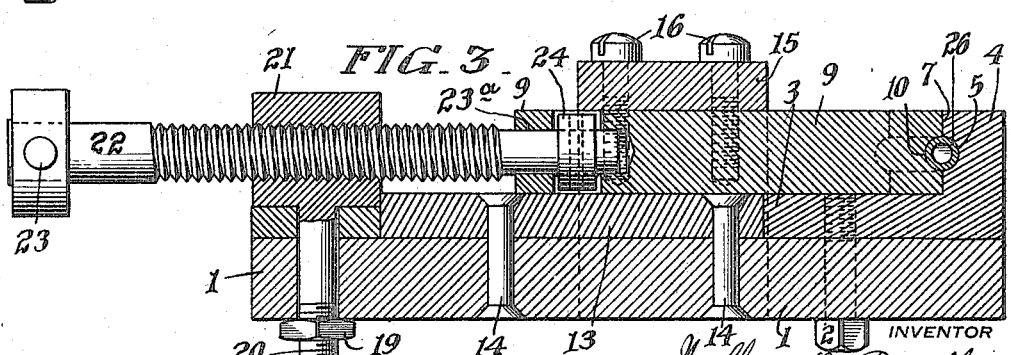
WITNESSES
Daniel Webster Jr.
William Conway.
INVENTOR
William O. Powell
BY Cornelius D. Ehret
his ATTORNEY

UNITED STATES PATENT OFFICE.

WILLIAM O. POWELL, OF CHESTER, PENNSYLVANIA.

PIPE-BENDING MACHINE.

1,136,364.  Specification of Letters Patent.  Patented Apr. 20, 1915.

Application filed October 26, 1912. Serial No. 727,833.

*To all whom it may concern:*

Be it known that I, WILLIAM O. POWELL, a citizen of the United States, residing in the city of Chester, State of Pennsylvania, have invented a new and useful Pipe-Bending Machine, of which the following is a specification.

It is the object of my invention to provide means for or a machine for bending pipe; and it is the object of my invention to provide means for bending a pipe without flattening or destroying the shape or contour of the pipe, even in the case where the bend is a relatively sharp one.

To these ends my invention resides in the means and machine hereinafter described and claimed.

For an illustration of one of the forms my invention may take reference is to be had to the accompanying drawing, in which:

Figure 1 is a top plan view of a machine embodying my invention, the parts being in position for the beginning of the bending. Fig. 2 is a view similar to Fig. 1 showing a bend completed. Fig. 3 is a longitudinal sectional view through Fig. 2, some parts shown in elevation.

To the base 1 there is secured, as by bolts 2, a block 3 having the raised member 4 provided with a groove 5, substantially round to conform to the exterior of a pipe, the groove 5 being curved, as seen in Figs. 1 and 2, to the form of the bend to be made in the pipe. The ends of the groove 5 are rounded off at 6. The front edge 7 of the member 4, which edge also forms the front boundary of the groove 5, is curved substantially parallel with the groove 5 and is adapted to receive the front edge 8 of the movable member 9 having the groove 10 of a cross section similar to the cross section of the groove 5 to closely embrace the pipe. At its side the member 9 may be cut away as indicated at 11, leaving the sides 12 of the member 9 substantially tangent to the curve of the bend and operating as bearing surfaces for the pipe at or near the completion of the bend. The member 9 slides backwardly and forwardly upon the plate 13 secured to the base 1 by bolts or other means 14, and over a portion of the block 3. Confining and guiding the member 9 is a top plate 15 held by bolts 16 to vertical pieces 18 secured to the sides of the base 1 by bolts 17. Secured to the base 1 by nut 19 engaging stem 20 is the nut 21 through which there is threaded a bar or screw 22 provided with the operating handle 23 for turning the same. The other end of the screw 22 passes through an aperture 23ª in the block 9 and has secured to it the collar 24 disposed in slot 25 in the member 9.

The operation is as follows: The member 9 is retracted by screw 22 when the handle 23 is turned in proper direction, separating the member 9 from the member 4 sufficiently to introduce the pipe 26 which is to be bent. Just before the bending begins the pipe 26 is in a position shown in Fig. 1. Then by turning the handle 23 the member 9 is forced toward the right, the pipe 26 bearing upon the rounded corners 6 of the member 4. As the member 9 continues this movement to the right the pipe yields and bends, the member 9 forcing the pipe into the groove 5 of member 4, the pipe simultaneously bending around the curved nose in the groove 10 in member 9, until finally the position indicated in Fig. 2 is reached where the bend is completed and the member 9 has reached the member 4, the pipe 26 being closely held in the complete groove or channel formed of the channels or grooves 5 and 10.

By this construction any tendency on the part of the pipe to flatten is overcome and the pipe maintained round at all parts of the bend. Upon retracting the member 9 the bent pipe is removable from the machine. In the drawings I have illustrated an arrangement which will make a 90 degree bend; but it is to be understood that bends of different angular extent may be made as desired by suitably shaping the members 4 and 9 where they come into contact with the pipe.

What I claim is:

1. In a pipe bending machine, a base, a stationary member resting upon said base and having one end thereof enlarged forming a stationary jaw having an inner concave side, a movable jaw mounted to slide upon the stationary member to and from the stationary jaw, an extension formed upon the movable jaw, the ends of which terminate at the ends of the stationary jaw, said jaws having grooves provided therein, the said groove in the movable jaw terminating at the ends of the enlargement and having their inner sides disposed flush with the sides of the movable jaw.

2. In a pipe bending machine, a base, a plate secured to said base in spaced relation from the ends thereof, a block secured to the base and contacting with the adjacent side of the base, said block having an enlarged portion formed upon one end thereof forming a stationary jaw, a movable jaw slidable upon the block and plate to and from the stationary jaw, said movable jaw having a recess formed in one end thereof, an operating rod engaging said recess, and a top plate engaging the movable jaw and passing over said recess and preventing the displacement of the operating member therefrom.

In testimony whereof I have hereunto affixed my signature in the presence of the two subscribing witnesses.

WILLIAM O. POWELL.

Witnesses:
 LOVINA BANKS,
 REBA CASS.

Copies of this patent may be obtained for five cents each, by addressing the "Commissioner of Patents, Washington, D. C."